July 16, 1968     J. J. LARKINS     3,392,872
HOLE CLOSURE DEVICE
Filed April 4, 1966

*INVENTOR*
JOSEPH J. LARKINS

BY *Edward M. Farrell*

ATTORNEY

United States Patent Office 3,392,872
Patented July 16, 1968

3,392,872
HOLE CLOSURE DEVICE
Joseph J. Larkins, 325 Delaware Ave.,
Riverside, N.J. 08075
Filed Apr. 4, 1966, Ser. No. 539,959
7 Claims. (Cl. 220—59)

ABSTRACT OF THE DISCLOSURE

An integral closure includes a main surface having projecting prongs formed from the interior portion of the main surface and forming apertures therein. The apertures are adapted to receive a tool to permit the prongs to be bent and mounted to seal an opening in a structure such as an electrical outlet box.

---

This invention relates to closure elements, and more particularly to plug devices for closing holes in the surfaces of structures.

One piece closure buttons or knockout plugs for closing holes in terminal boxes have been and still are used extensively. These closure devices are used with electrical terminal boxes into which electrical cables or individual wires extend. Since it is generally not possible to predetermine the location of openings in standard boxes since the boxes may be mounted in a variety of different positions and locations, the boxes are provided with perforated areas which permits portions of the boxes to be knocked out to provide suitable openings. Upon completion of the installation, it is necessary to close any holes in the box which do not receive any cables or conduits therethrough.

In the past, closure elements have been in the form of circular plugs or buttons dimensioned to fit into and fill the holes in the box. Generally such closure elements have included a plurality of flexible or spring-like fingers extending therefrom. The fingers are resilient so that when a plug element is pressed into a hole, the flexible fingers are compressed. When the closure element is completely inserted, the flexible fingers are shaped so that they spring back into their original position to provide tension to hold the closure in place.

While these closure devices offer advantages in facilitating the plugging of unnecessary holes in an electrical terminal box, they are not without some disadvantages. For example, the flexible fingers of such devices extend into the terminal box and may tend to short circuit or ground various electrical conductors within the box unless extreme care is exercised. Further, many electrical boxes are in environments which subject them to vibrations and shock tending to cause the closure to be accidentally shaken out of the hole.

In many cases, installation of closures are necessary when the connections within a terminal box are electrically energized. Sometimes it is very inconvenient to cut off the power to install the closures and secure them in place by taking off panel covers and working inside the box. In these cases, installation and firmly securing the closure from outside the box without cutting off the power is highly desirable.

In a copending application, Ser. No. 454,382, filed May 10, 1965, entitled "Hole Closure For Electrical Terminal Box," the same applicant discloses a closure device which minimizes some of the problems discussed above. While solving the problem relating to possible short circuits to a great extent, the closure device in the copending application requires the use of progressive step punches and dies for manufacture. This requirement adds to the average cost of manufacturing the closure devices.

It is an object of this invention to provide an improved knockout seal.

It is a further object of this invention to provide an improved closure which may be installed and fastened to an electrical terminal box without the need to work inside the box.

It is a further object of this invention to provide an improved knockout seal for an electrical box wherein the possibility of electrical short circuits with the seal is minimized.

It is still a further object of this invention to provide an improved knockout seal which will not be removed from an electrical terminal box when subject to severe vibrations.

It is still a further object of this invention to provide an improved one piece knockout plug which may be manufactured relatively cheaply by a one punch operation.

It is still a further object of this invention to provide an improved knockout plug which may be manufactured without the need of complicated punches and dies requiring multiple operating steps during manufacture.

It is still a further object of this invention to provide an improved knockout plug which is held securely in place against jarring and vibrations but is still removable.

It is still a further object of this invention to provide an improved plug which is substantially aligned with the surface of a terminal box when it is installed.

In accordance with the present invention, a closure for covering a hole in a surface of a structure is provided. The closure includes a flat main surface area including a plurality of prongs extending therefrom. Formation of the prongs result in the formation of a plurality of apertures in the closure. The prongs are spaced to fit into the hole in the structure and dimensioned to physically engage the interior wall of the structure when the prongs are bent. The apertures in the closure permit a tool to be inserted therethrough with the tool being designed to engage the prongs during a bending operation in which the outer extending portions of the prongs are flattened against the interior wall of the structure to hold the closure securely in place.

Other objects and advantages of the present invention will be apparent and suggest themselves to those skilled in the art, from a reading of the following specification and claims, in conjunction with the accompanying drawing, in which:

The present invention will be described in accordance with a preferred embodiment. This embodiment involves a conventional terminal box adapted to receive various electrical conduits which normally must be electrically connected within the box.

Figure 1:
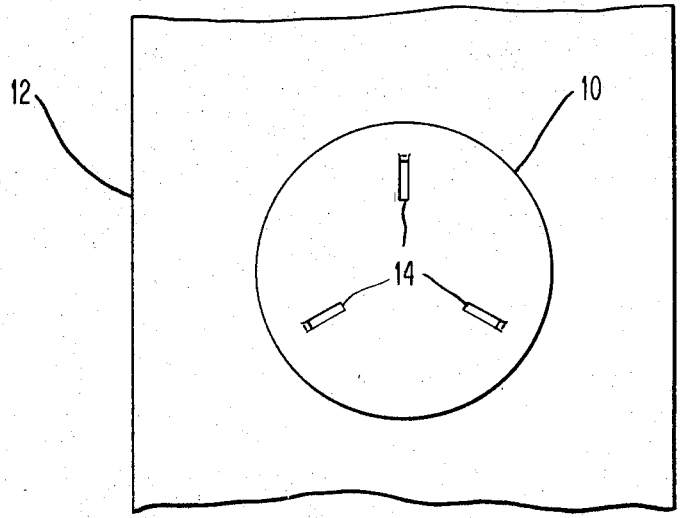
FIGURE 1 is a closure element inserted into a hole of a structure, in accordance with the present invention.

Referring particularly to FIGURE 1, a closure element 10 is securely mounted to cover a hole in the surface of the structure 12. The closure includes three substantially equally spaced apertures 14. As will be described these apertures 14 permit the insertion of a tool therethrough for securing the closure to the structure.

Figure 2:
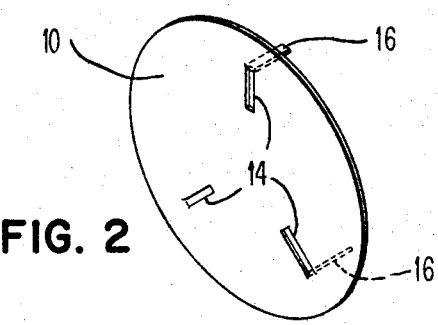
FIGURE 2 is a perspective view of a closure element before insertion into the structure.

Referring to FIGURE 2, the closure element 10 is illustrated separately prior to insertion into the structure 12. The closure 10 comprises a flat, circular metal piece which may be formed from a metal strip by a punch operation well known to those skilled in the art. A plurality of fingers or prongs 16 extend perpendicularly from the main body of the closure 10. These prongs are integral with the main body of the closure 10 and may be formed during the same punch operation as the operation producing the main body of the closure.

The prongs 16 extending from the interior surface of the closure 10 result in the apertures 14 within the closure. The spacing of the prongs 16, i.e., the spacing from the center of the closure 10, is dependent upon the size of the hole to be covered. In conventional electrical "knock-out" plugs, the closure may approximate one inch in diameter.

Figure 3:
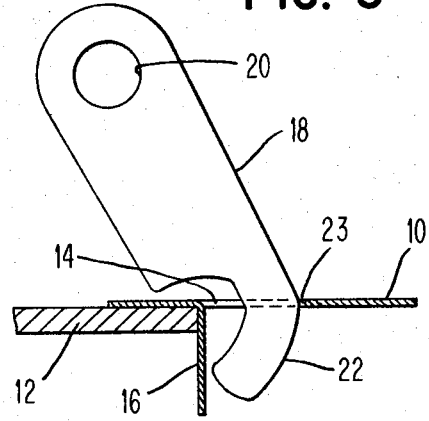
FIGURE 3 is a partial cross-sectional view illustrating the closure element inserted into the hole of the structure prior to the prongs of the closure element being bent into position by a tool.

Referring to FIGURE 3, the closure 10 is illustrated within a hole of the structure 12 prior to securing the closure. As illustrated, the prongs 16 extending in a perpendicular direction from the main flat surface of the closure into the hole of the structure.

A tool 18 is provided to be inserted into the apertures 14 to bend the ends of the prongs 16 to secure the closure 10 to the structure 12. The tool 18 may be a flat key like element including a hole 20. The tool may be carried by a workman on a key ring, for example, by inserting the key ring through the hole 20. The tool may be a flat metallic piece capable of being formed by a simple operation. It is contemplated that when quantities of the closures 10 are packaged that one or more tools be included in the package to permit different workmen to install the closures.

One end of the tool 18 includes a cut away curved key portion 22. The dimensions of the end portion 22 are such that it may be inserted into the apertures 14 and engage the prongs 16. In FIGURE 3, the tool 18 is disposed within one of the apertures 14 at an angle and adapted to be moved in a clockwise direction. When the tool 18 is moved in a clockwise direction, a leverage action takes place to cause the prong 16 to be bent. The end portion 22 of the tool is pressed against the cross sectional edge 23 of the closure element. This area may be considered as a fulcrum point across which the heel of the tool slides as it is arcuately moved to bend the prongs. The action may be considered somewhat similar to a cam action which forces an element along a desired direction.

Figure 4:
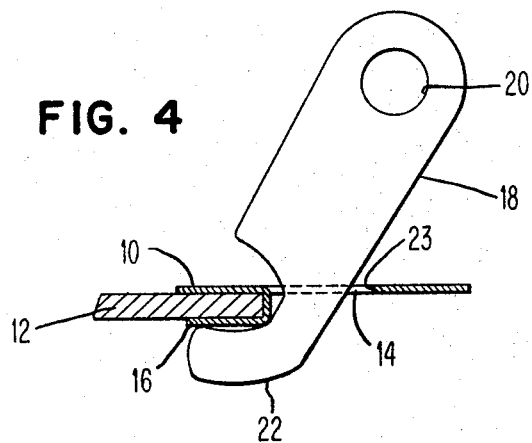
FIGURE 4 is a partial cross-sectional view, similar to FIGURE 3, after the prongs of the closure element have been bent into position.

FIGURE 4 illustrates the completion of the operation of securing the closure 10 to the structure 12.

After the tool 18 has been moved over a set angle the end portion 22 bends the ends of the prongs 16 in a substantially perpendicular direction outwardly towards the periphery of the closure into flattened positions against the inner wall of the structure 12.

The flattened end portions of the prongs 16 against the interior wall of the structure 12 minimizes the possibility of short circuits developing between the electrical connections within the structure 12 and the structure itself. Further, the flattened end portions provide firm mechanical connections which minimize the likelihood of the closure becoming detached when subjected to heavy vibrations or other environmental disturbances.

While the subject invention requires some additional labor for installation over plugs described in the aforementioned copending application, this is offset by the initial cost of the closure and its simplicity and ease of manufacture. Conventional plugs, not including the type covered by the copending application, often require the flattening of prongs by pliers within the interior of the box and in these cases the total labor for installation would be less than required in the latter cases.

While the preferred embodiment discloses these apertures in the closure, it is apparent that more apertures could be provided. It is also apparent that the dimensions of the end portion of the tool must be related to the thickness of the walls of the structures with which the closure is to be used to attain a complete flattening of the ends of the prongs.

While an electrical terminal box has been illustrated, it is conceivable that the subject invention may find other applications wherein a hole is covered and securing the closure from the outside of a structure is required.

What is claimed is:
1. A closure element for covering a hole in a surface of a structure, said closure element comprising a main surface area having apertures therein and prongs extending therefrom, said apertures being disposed inwardly away from the outer edge toward the center of said closure device, said prongs being spaced to fit into the hole of said structure and dimensioned to engage the interior of said structure when said prongs are bent by a tool inserted through said apertures.

2. A closure element as set forth in claim 1 wherein said closure element comprises an integral unit.

3. The invention as set forth in claim 2 wherein said prongs form protruding portions drawn from said main surface with said protruding portions forming said apertures.

4. The invention as set forth in claim 3 wherein said closure element is substantially circular and said plurality of prongs comprise three or more prongs which are substantially equally spaced with respect to each other.

5. The invention as set forth in claim 4 wherein said prongs are disposed at substantially right angles with respect to said main surface area and said tool comprises an end portion shaped to engage said prongs and a movement of said tool forces said prongs to bend in a manner so that the bent portions flatten along the inner wall of said structure.

6. The invention as set forth in claim 5 wherein said tool comprises a flat metal element having an aperture therein.

7. The invention as set forth in claim 5 wherein said closure element comprises a knock-out plug and said structure comprises an electrical terminal box.

References Cited

UNITED STATES PATENTS

| 1,345,489 | 7/1920 | Horton | 220—27 |
| 2,533,779 | 12/1950 | Emde | 220—59 |

THERON E. CONDON, *Primary Examiner.*

GEORGE T. HALL, *Examiner.*